Sept. 6, 1938.   J. V. SCHAFER   2,129,386
FISHING REEL
Filed Feb. 4, 1935   4 Sheets-Sheet 1
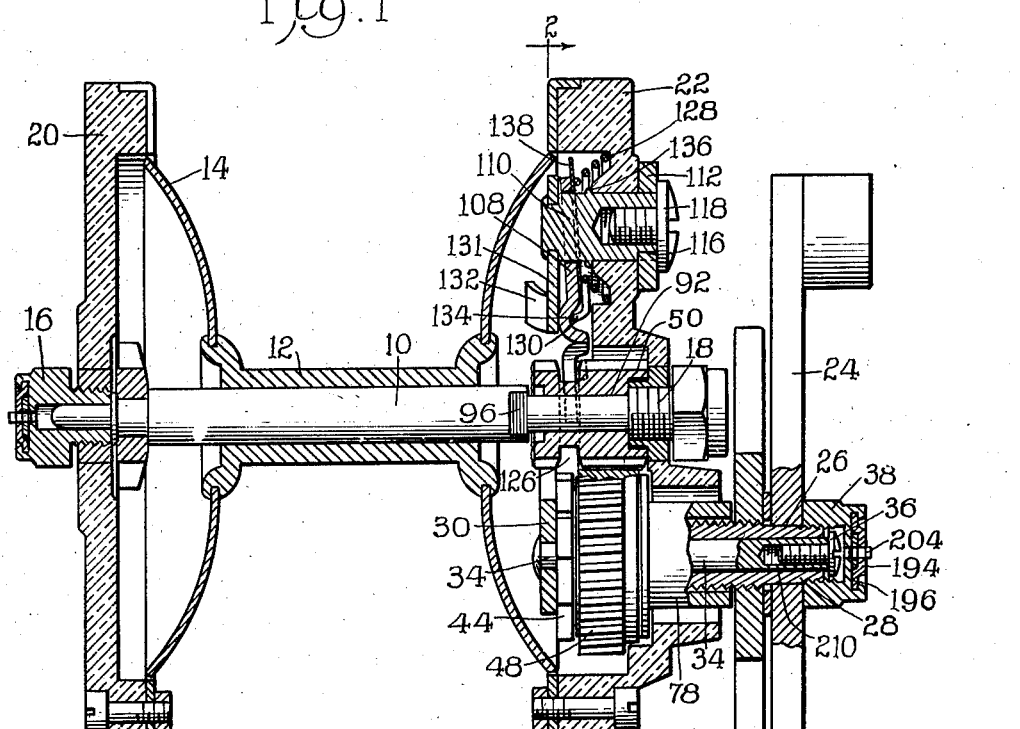
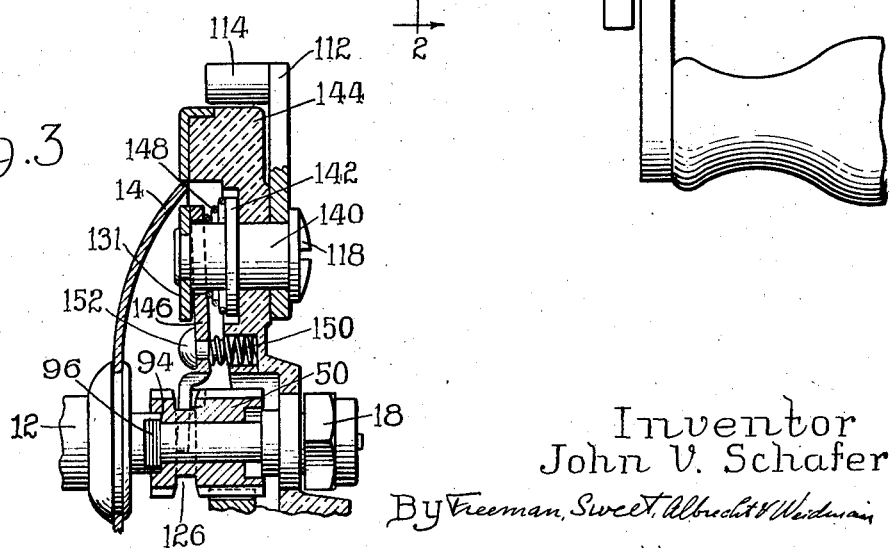
Inventor
John V. Schafer
By Freeman, Sweet, Albrecht & Weidman
Attorneys Sept. 6, 1938.  J. V. SCHAFER  2,129,386
FISHING REEL
Filed Feb. 4, 1935  4 Sheets-Sheet 2
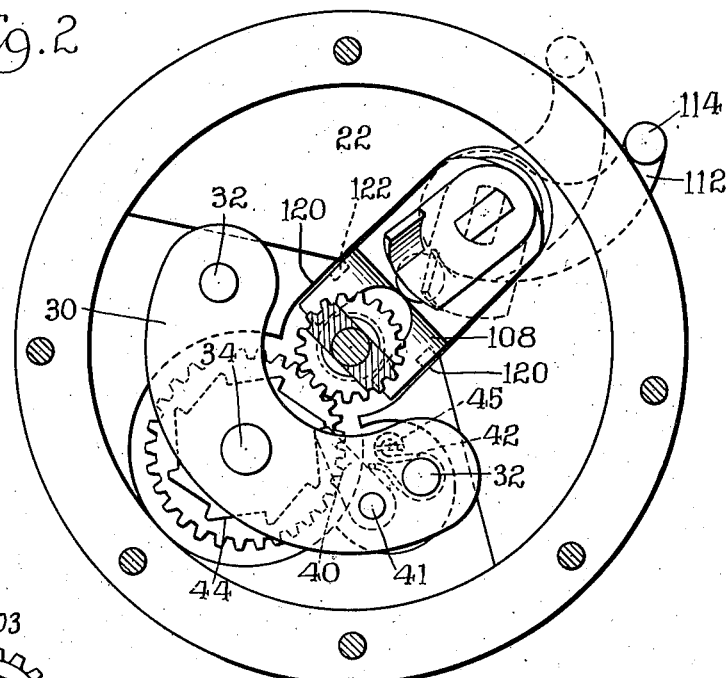
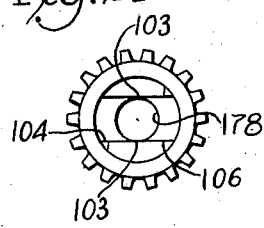
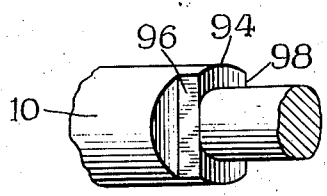
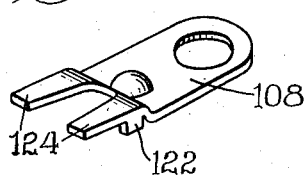
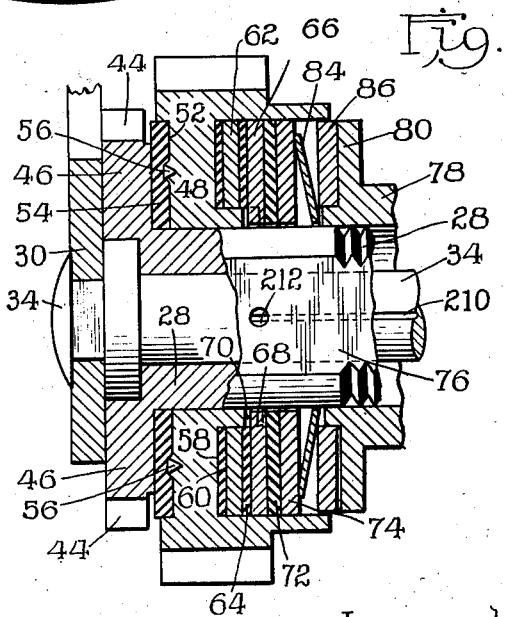
Inventor:
John V. Schafer
By Freeman, Sweet, Albrecht & Weidman
Attorneys

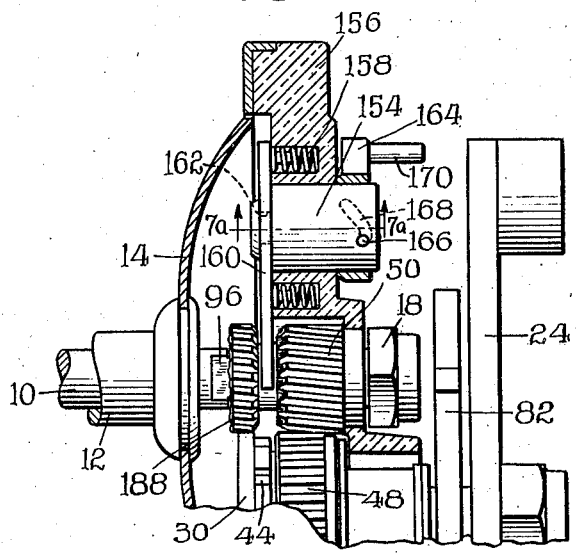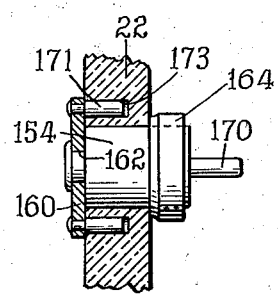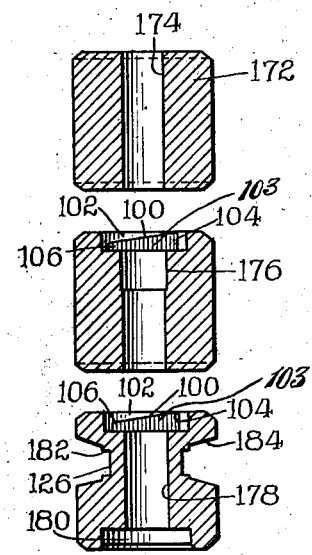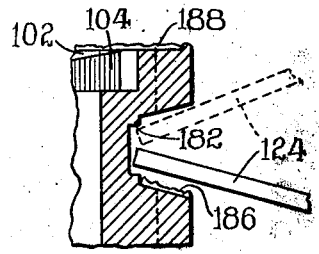

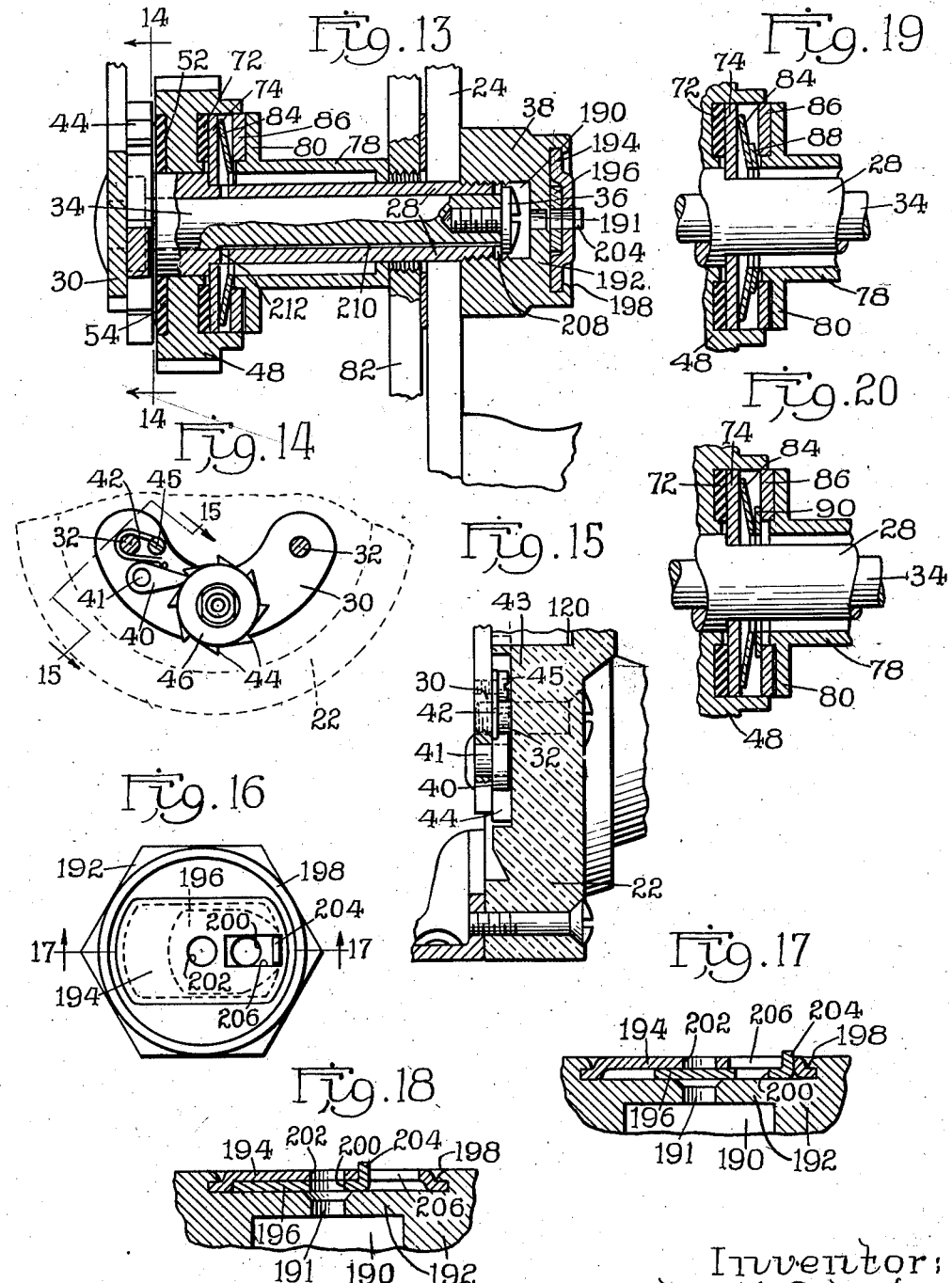

Patented Sept. 6, 1938

2,129,386

UNITED STATES PATENT OFFICE 2,129,386

FISHING REEL

John V. Schafer, Bronson, Mich., assignor to Bronson Reel Company, Bronson, Mich., a corporation of Michigan Application February 4, 1935, Serial No. 4,731

20 Claims. (Cl. 242—84.5)

My invention relates to fishing reels and includes among its objects and advantages increased positiveness and reliability in connecting and disconnecting the spool with a driving transmission therefor, more reliable application of braking force by reason of special clutch means and better external lubrication for the clutch, and simpler assembly and replacement of the pawl means cooperating with the clutch.

In the accompanying drawings:

Figure 1 is a sectional view of a reel according to the invention;

Figure 2 is a section on line 2—2 of Figure 1;

Figure 3 is a section of the clutch-actuating mechanism indicating an alternative arrangement for actuating the clutch;

Figure 4 is a section through the friction clutch;

Figure 5 is a fragmentary perspective view of the clutch-engaging portion of the spool shaft;

Figure 6 is a perspective view of the clutch-actuating lever;

Figure 7 is a section similar to Figure 3 indicating another alternative actuating mechanism;

Figure 7a is a detail section on line 7a—7a of Figure 7;

Figure 8 is a sectional view of a blank from which the drive pinion of Figure 1 is to be formed;

Figures 9 and 10 are similar views of successive stages in the manufacture of the clutch;

Figure 11 is a side elevation of the finished clutch;

Figure 12 is an enlarged detail indicating the clearances available in shifting such a clutch;

Figure 13 is a section of a simplified friction mechanism;

Figure 14 is a section on line 14—14 of Figure 13;

Figure 15 is a section on line 15—15 of Figure 14;

Figure 16 is an end view of the closure nut;

Figures 17 and 18 are sections on line 17—17 of Figure 16, showing the parts in different positions;

Figures 19 and 20 are fragmentary sections similar to Figure 13 showing alternative spring arrangements; and Figure 21 is a plan view of the pinion of Figure 11.

In the embodiment of the invention selected for illustration in Figure 1, the spool shaft 10 carries the rigidly assembled sleeve 12 and flanges 14 and is journaled at its ends in bearings 16 and 18 in the tail plate 20 and headplate 22, respectively. The crank 24 is clamped against rotation on a polygonal portion 26 of the tubular drive shaft 28. The bridge 30 is fastened by bolts 32 (see Figure 2) to the head plate, and carries the stud 34 which forms the supporting pintle for the shaft 28. The shaft 28 is held against axial movement by a retaining screw 36, and the handle clamping nut 38 is in the form of a bonnet, housing and protecting the retaining screw 36. The pawl 40 (see Figure 2) is resiliently pressed by the spring 42 into engagement with ratchet teeth 44 on the periphery of the flange or ratchet wheel 46 at the butt of the shaft 28, and operates to prevent rotation of the shaft except in the direction of reeling in. The pawl 40 is removably slipped in place on the pawl stud 41 (see Figures 14 and 15), carried by the bridge 30. The spring 42 is permanently assembled on the bridge 30 by a fastening screw 45, but the screw 45 is not required to function as the sole support and guidance for the spring. An intermediate portion of the spring encircles the adjacent bolt 32. When the bridge is fastened in place, the head plate 22 includes a portion 43 (Figure 15) which holds the pawl against slipping off the stud, and the screw 45 against working loose.

Drag

The drive from the shaft 28 to the spool shaft 10 is through the gear 48 and pinion 50. Between the gear 48 and the shaft 28 I provide adjustable friction means tending to force the gear and shaft to rotate together. The web of the gear 48 is chambered at 52 to receive a friction washer 54 lying between the gear web and the flange 46. The bottom of the chamber 52 is made irregular as by striking with a center punch to form surface irregularities indicated at 56. This insures that the friction surface will be that between the washer 54 and the flange 46.

In the opposite side of the web is formed a deeper annular chamber at 58. Inside this chamber are nested—first, a leather washer 60; second, a metal washer, 62; third, another leather washer 64; and fourth, a keyed metal washer 66. The washer 66 has radial lugs projecting inwardly at 68 to enter notches at 70 in the hub of the gear 48, and this compels the washer 66 to rotate with the gear 48. Above the washer 66 I position a leather friction washer 72 which may be compressed between the washer 66, which turns with the gear 48, and the washer 74 which abuts the flat sides 76 on the shaft 28 and turns with the shaft.

To generate the thrust for such compression I employ a sleeve 78, axially slidable but not rotatable on the shaft 28. The sleeve 78 may be clamped down to compress the parts between the gear 48 and its flange 80 by means of the usual star wheel 82 bearing against the outer end of the sleeve.

To make the application of force by the star wheel so gradual that the user can control it with nicety, I interpose spring means between the flange 80 and the washer 74. In Figure 4 I have illustrated a conical spring washer 84 of spring metal with its outer edge bearing against the washer 74. Between the flange 80 and the spring 84 I interpose a much more flexible spring 86 in the form of the ordinary split spring, or lock, washer. When the sleeve is pressed down enough to flex the spring 84, the spring 86 is flattened out completely, but backing off the sleeve to relieve spring 84 brings spring 86 into action. Thus two distinctly different ranges of sensitivity are provided.

The washers nested between the washer 66 and the gear web do not operate as friction washers, but form a cushion to render less abrupt the seizure of the friction washers when the star wheel is actuated, especially under heavy load. As the parts are kept well oiled, it is probable that this action results partly from the compressibility of the leather washers themselves, and partly from the infiltration by capillary action of films of oil between the washers when they are not under a compression load, which films of oil work out only gradually when the load is put on. I find that during a rapid run by a fish, the effective friction in such a clutch tends to decrease somewhat, and to that extent the load-sensitive set of washers 60, 62, 64, compensates for the decrease in the diameter of the mass of line wound on the spool.

In the simplified construction of Figure 13, the washers 60, 62, 64, and 66 are simply omitted and the friction washer 72 is laid directly against the web of the gear. In Figure 19 an additional conical sheet spring washer 88 is laid between spring 86 and spring 84. In this construction the first stage is up to the flattening of spring 86, the second stage is until the spring 84 is about half flat and further force begins to flatten spring 88 to introduce a third stage.

In Figure 20 the smaller washer is a flat one 90 and the washer 90 carries the load in from the inner edge of the spring 86 to the inner edge of the spring 84. In this embodiment, using the same parts as in Figure 19 except for substituting the flat washer 90 for the conical one 88, substantially lower forces are available with correspondingly better control than in Figure 19, during the second stage.

Free spool

The drive pinion 50 has a cylindrical bearing at 92 on the spool shaft 10 and is axially movable from the position of Figure 1, with the spool free to rotate independent of the handle, to the position of Figure 3. The shaft 10 has a shoulder at 94 formed by reducing the diameter of the shaft, and this shoulder is milled away at 96 and on the opposite side at 98. The oppositely extending ends of the shoulder 94 function as clutch teeth to engage the female clutch parts formed in the pinion 50. Corresponding parts are formed in the drive pinion 50 except that the segmental portions 103 are relieved as clearly indicated in Figures 9 and 10, leaving the full face 104 of the jaw available for driving in the direction of reeling in, but lowering the end of the jaw back of the advancing face. Referring to Figure 10, the pocket 102 contains two clutch segments 103 having front faces of full height at 104 and rear faces approximately half as high at 106. The inclined end surface of the segment 103 is shown at 100 in Figures 9 and 10. This inclined end surface rides on the adjacent abutting portion of the shoulder 94 of Figure 5 and lets the gear move half way in before the full height front face 104 strikes the milled surface 96 of Figure 5.

The mechanism I have illustrated for shifting the drive pinion into and out of clutching engagement comprises an actuating lever 108 floating on a shaft 110 journaled in the head plate 22. The shaft 110 is provided with external actuating means in the form of an arm 112 carrying an actuating handle 114 and engaging a flat portion at 116 on the shaft 110 and fastened in place by retaining screw 118. The free end of the operating lever 108 lies between shoulders 120 on the headplate and has depending ears 122 to insure continued engagement with the shoulders throughout the range of movement of the lever arm.

The end of the lever terminates in toes 124 entering a peripheral groove at 126 in the drive pinion.

The lever 108 is apertured to receive the shaft 110 with clearance to permit tipping of the lever, and is biased toward the position of clutching engagement by a coiled spring 128 having coils of decreasing diameter. The final coil of the spring 128 is brought out radially in an arm 130 underlying the lever remote from the shaft 110 to press its free end away from the head 22.

Rigid with the shaft 110 is an actuating cam in the form of a plate 131 having a flat portion adapted to hold the lever in the position of Figure 1 and a camming portion 132 adapted to ride up over a button 134 on the adjacent surface of the lever 108 and press the lever down. In the embodiment of Figure 1, the button 134 is formed by striking up the metal of which the lever 108 is made, and the opposite side of the same protuberance is a concavity positioned to receive the end 130 of the spring 128. The shaft 110 is provided with a flange 136 engaging the head 22 to hold the shaft against axial movement. Between the spring 128 and the lever 108 I position a thin washer 138 of fairly large diameter to form an abutment for the central portion of the spring 128.

In Figure 3 the shaft 140 differs from shaft 110 in having a large integral flange 142 at the bottom of a flat pocket in the head plate 144. The same arm 131 is employed but the lever 146 is pressed away from the head plate by two springs, a helicospiral spring 148 encircling the shaft 140 and a smaller helical spring 150 pressing against the extending reach of the arm. The contact button for the cam is a rivet 152 which also guides the spring 150.

In Figure 7 the shaft 154 is axially slidable but not rotatable in the head 156 and is urged away from the head by two or more small helical springs 158. Pins 171 in guide holes 173 restrain the shaft from rotating (see Figure 7a). Accordingly, it may carry a clutch shifting arm 160 having a rigid mounting at 162 at the end of the shaft 154. The actuating arm 164 encircles the outer end of the shaft 154 which carries a pin 166 projecting radially outward into a cam slot 168. In the position illustrated the clutch pinion 50 is out of engagement with the clutch teeth 96, but movement of the handle 170 toward the observer will move the slot 168 past the pin 166 and permit the springs 158 to throw the clutch in.

Pinion making

In manufacturing the clutch pinion 50 I first drill and bevel the corners of a suitable blank 172, as clearly shown in Figure 8. This blank is then placed in a punch press and changed to the shape of Figure 9 in a single operation. The male die forms the cylindrical pocket at 102 and the segmental clutch jaws with full front faces at 104 and half height rear faces at 106. The cylindrical portion of this die is slightly larger than the original bore 174 and makes the enlargement shown at 176. The next operation is to enlarge the bore 174 to a final diameter a trifle larger than the bore 176, as indicated at 178 in Figure 10. Preferably in the same screw machine the butt pocket 180 is fashioned and the annular groove 126 with short straight sides at 182 and longer inclined sides at 184.

A plurality of blanks finished as in Figure 10 may now be assembled on a single shaft or arbor, and the teeth on all of them cut at a single operation to produce the finished clutch gear of Figure 11. In this gear there will be burrs or small projections of metal torn by the teeth of the hob, at 186 and also at 188. These are shown on an enlarged scale in Figure 12, and it will be noted that the prongs 124 used to shift the clutch gear act against the shoulders 182, and in no position do they come close enough to the burrs 186 to necessitate any removal or polishing away of the burrs. Similarly, it will be obvious in Figures 1, 3, and 7, that the similar burrs at 188 lie where they will never get in the way of any other moving part, and therefore need not be removed.

Oiling

Particularly to insure maximum effectiveness for the washers 60, 62, and 64, it is desirable to keep the upper pocket of the gear 48 well lubricated.

Referring to Figures 13 and 16 to 18, the nut 38 is formed with an internal chamber at 190 covered by the web 192, having a central aperture 191. A shallow circular depression in the outer end face receives the fixed plate 194, which is struck up to house the slide 196 between itself and the web 192. The plate 194 is permanently fastened by swedging in the edges of the depression at 198. The slide 196 is apertured at 200, and the plate 194 has a central aperture 202. The slide 196 carries an upturned actuating finger 204 moving in a slot 206 in the plate 194. In Figure 17 the holes 200 and 202 are out of register and oil will be retained. In Figure 18 the holes are in register and oil may enter the chamber 190.

To insure getting the oil past the plane of the crank 24, I notch the upper end of shaft 28 at 208. This insures access to the crack between stud 34 and shaft 28, and capillary action will take the oil down to the parts requiring it. However, to concentrate the delivery on the pocket above washers 60, 62, and 64, I prefer to provide a longitudinal groove 210 in the stud 34, and radial openings 212 in shaft 28, opening directly into the space around the spring 84. Referring to Figure 1 it will be noted that I have provided both bearings 16 and 18 with oil receiving means identical with that for nut 38.

Without further elaboration, the foregoing will so fully explain my invention that others may, by applying knowledge current at the time of application, readily adapt the same for use under various conditions of service.

I claim:

1. In a fishing reel, in combination, a spool shaft, and a drive pinion axially movable on said shaft; said shaft and pinion having interengaging clutch teeth for connecting and disconnecting the pinion and shaft by axial movement of the pinion, said clutch teeth having driving faces positioned to abut for driving the spool in the direction of reeling in, said teeth having also surfaces for axial abutment, certain of said axial abutment surfaces being inclined to let the pinion move part way in axially before the parts reach the position where said driving faces come into operative engagement, and means rendered operative by completion of the inward axial movement for coupling the parts together completely.

2. In a fishing reel, in combination, a spool, a rigid frame rotatably supporting said spool and including an end plate, a clutch member adjacent said end plate and movable parallel to the spool axis, and manual means for actuating said clutch member, said manual means including a clutch shifting lever fulcrumed at one end, and engaging the clutch at its other end, spring means pressing on said lever intermediate its ends and tending to move the clutch into engagement, and manually actuated cam means positioned to engage said lever at substantially the same point as said spring means and move the clutch out of engagement, said cam means including a cam element, a rotatable shaft carrying said element and journaled in and extending through said end plate, and a handle on the externally projecting end of said shaft, said handle lying close against said end plate and moving parallel thereto, said rotatable shaft extending through one end of said clutch-shifting lever with a loose fit, and constituting the fulcrum for said lever.

3. In a fishing reel, in combination, a spool, a rigid frame rotatably supporting said spool and including an end plate, a clutch member adjacent said end plate and movable parallel to the spool axis, and manual means for actuating said clutch member, said manual means including a clutch shifting lever fulcrumed at one end, spring means pressing on said lever and tending to move the clutch into engagement, and manually actuated cam means positioned to engage said lever and move the clutch out of engagement, said cam means including a cam element, a rotatable shaft carrying said element and journaled in and extending through said end plate, and a handle on the externally projecting end of said shaft, said handle lying close against said end plate and moving parallel thereto, said rotatable shaft extending through one end of said clutch-shifting lever with a loose fit, and constituting the fulcrum for said lever.

4. In a fishing reel, in combination, a spool, a rigid frame rotatably supporting said spool and including an end plate, a clutch member adjacent said end plate and movable parallel to the spool axis, and manual means for actuating said clutch member, said manual means including a clutch shifting lever fulcrumed at one end, spring means pressing on said lever and tending to move the clutch into engagement, and manually actuated cam means positioned to engage said lever and move the clutch out of engagement, said cam means including a cam element, a rotatable shaft carrying said element and journaled in and extending through said end plate, and a handle on the externally projecting end of said shaft, said rotatable shaft extending through one end of said clutch-shifting lever with a loose fit, and constituting the fulcrum for said lever.

5. In a fishing reel, in combination: a drive shaft; a gear rotatable on said drive shaft; friction means acting between said shaft and said gear and tending to cause said gear and shaft to turn together; and two different instrumentalities affecting the amount of said friction; said instrumentalities comprising a first adjustable manual means for compressing said friction means to affect the amount of friction; and a second automatic load-sensitive means operating responsive to relative rotation of said gear and said shaft, for reducing said friction cumulatively as relative rotation occurs; both said instrumentalities operating on said friction means at all times, whereby the effective action of said friction means represents the sum of the actions that would result from either instrumentality operating alone; said automatic load-sensitive means comprising an axially acting cushioning instrumentality.

6. In a fishing reel, in combination: a drive shaft; a gear rotatable on said drive shaft; friction means acting between said shaft and said gear and tending to cause said gear and shaft to turn together; and two different instrumentalities affecting the amount of said friction; said instrumentalities comprising a first adjustable manual means for compressing said friction means to affect the amount of friction; and a second automatic load-sensitive means operating responsive to relative rotation of said gear and said shaft, for reducing said friction cumulatively as relative rotation occurs; both said instrumentalities operating on said friction means at all times, whereby the effective action of said friction means represents the sum of the actions that would result from either instrumentality operating alone.

7. In a fishing reel, in combination, a bridge member; a stud rigidly mounted on said bridge member; an annular drive shaft rotatably mounted on said stud; a ratchet wheel on the end of said shaft adjacent said bridge; a pawl stud on said bridge; a pawl removably pivoted on said stud and adapted to prevent rotation of said shaft in the direction of reeling out; a spring to urge said pawl into engagement with said ratchet; a drive gear above said ratchet wheel having a portion overlying the end of said pawl; and a supporting head having a recess shaped to receive said pawl and restrain the butt of said pawl from slipping off its stud.

8. In a fishing reel, in combination, a bridge member; a stud rigidly mounted on said bridge member; an annular drive shaft rotatably mounted on said stud; a ratchet wheel on the end of said shaft adjacent said bridge; a pawl stud on said bridge; a pawl removably pivoted on said stud and adapted to prevent rotation of said shaft in the direction of reeling out; a spring having one end anchored to said bridge, and the other end positioned to urge said pawl into engagement with said ratchet, said bridge being apertured to receive fastening means, said spring having an intermediate portion positioned adjacent said aperture and adapted to encircle and be guided by a fastening means passing through said aperture; a drive gear above said ratchet wheel having a rim portion overlying the end of said pawl, and a web portion overlying said ratchet wheel; and a supporting head having a recess shaped to receive said pawl and restrain the butt of said pawl from slipping off its stud.

9. In a fishing reel, in combination, a bridge member; a stud rigidly mounted on said bridge member; an annular drive shaft rotatably mounted on said stud; a ratchet wheel on the end of said shaft adjacent said bridge; a pawl stud on said bridge, a pawl removably pivoted on said stud and adapted to prevent rotation of said shaft in the direction of reeling out; and a bridge-supporting head having a recess shaped to receive said pawl and restrain the butt of said pawl from slipping off its stud.

10. In a fishing reel, in combination, a bridge member; a stud rigidly mounted on said bridge member; an annular drive shaft rotatably mounted on said stud; a ratchet wheel on the end of said shaft adjacent said bridge; a pawl stud on said bridge; a pawl removably pivoted on said stud and adapted to prevent rotation of said shaft in the direction of reeling out; and a bridge support including a portion lying adjacent the end of said pawl stud and preventing said pawl from slipping off said stud.

11. In a fishing reel, in combination, a bridge member; a stud rigidly mounted on said bridge member; an annular drive shaft rotatably mounted on said stud; a ratchet wheel on the end of said shaft adjacent said bridge; a pawl stud on said bridge; a pawl removably pivoted on said stud and adapted to prevent rotation of said shaft in the direction of reeling out; a drive gear above said ratchet wheel; a lower annular friction washer between said gear and said ratchet wheel; an upper annular friction washer above said gear; means rotating with said shaft and including said ratchet wheel, for compressing said washers to drive said gear by friction, said means including parts defining an open space above said upper washer, said parts shaped to define an oil passage for delivering oil primarily to said space, subject to capillary seepage to both surfaces of both washers.

12. In a fishing reel, in combination, a bridge member; a stud rigidly mounted on said bridge member; an annular drive shaft rotatably mounted on said stud; a ratchet wheel on the end of said shaft adjacent said bridge; a pawl stud on said bridge; a pawl removably pivoted on said stud and adapted to prevent rotation of said shaft in the direction of reeling out; a drive gear above said ratchet wheel; a lower annular friction washer between said gear and said ratchet wheel; an upper annular friction washer above said gear; means rotating with said shaft and including said ratchet wheel, for compressing said washers to drive said gear by friction or absorb energy when slippage occurs, said means including parts shaped to define an oil passageway for delivering externally applied oil chiefly to a point above and adjacent to said upper annular washer, subject to capillary seepage to both surfaces of both washers.

13. In a fishing reel, in combination: a bridge member; a stud rigidly mounted on said bridge member; an annular drive shaft rotatably mounted on said stud; a ratchet wheel on the end of said shaft adjacent said bridge; a pawl stud on said bridge; a pawl removably pivoted on said stud and adapted to prevent rotation of said shaft in the direction of reeling out; a spring having one end anchored to said bridge, and the other end positioned to urge said pawl into engagement with said ratchet, said bridge being apertured to receive fastening means, said spring having an intermediate portion positioned adjacent said aperture and adapted to encircle and be guided by a fastening means passing through said aperture; a drive gear above said ratchet wheel having a rim portion overlying the end of said pawl, and a web portion overlying said ratchet wheel; a lower annular friction washer between said web and said ratchet wheel; an upper annular friction washer above said web; a thrust sleeve above said upper annular friction washer; a star wheel threaded on said shaft for forcing said thrust sleeve toward said friction washers; relatively stiff resilient means below said thrust sleeve and carrying the thrust, for rendering the gripping action of said friction discs gradual; load sensitive means depending on the presence of lubricant for operation, below said thrust sleeve and subject to the thrust thereof, for reducing the effective friction cumulatively as rotation continues; relatively weak resilient means normally entirely compressed by said thrust sleeve but tending to expand and prevent looseness when said thrust sleeve is backed away beyond the expansion limit of said relatively stiff resilient means; a crank fixed on said shaft above said star wheel; a fastening nut clamping said crank in place, said fastening nut having an oil-receiving opening therein, said stud and shaft being shaped to define oil passageways permitting oil to flow past said crank, down inside said shaft, and radially out adjacent said resilient means and said load sensitive means, to lubricate the same.

14. In a fishing reel, in combination: a drive member; a stud rigidly mounted on said bridge member; an annular drive shaft rotatably mounted on said stud; an annular flange on the end of said shaft adjacent said bridge; a drive gear having a web overlying said flange; a lower annular friction washer between said web and said flange; an upper annular friction washer above said web; a thrust sleeve above said upper annular friction washer; manual adjustment means on said shaft for forcing said thrust sleeve toward said friction washers; relatively stiff resilient means below said thrust sleeve and carrying the thrust for rendering the gripping action of said friction discs gradual; load-sensitive means depending on the presence of lubricant for operation, below said thrust sleeve and subject to the thrust thereof, for reducing the effective friction cumulatively as rotation continues; relatively weak resilient means normally entirely compressed by said thrust sleeve but tending to expand and prevent looseness when said thrust sleeve is backed away beyond the expansion limit of said relatively stiff resilient means; a crank fixed on said shaft above said adjustment means, a fastening nut clamping said crank in place, said fastening nut having an oil-receiving opening therein, said stud and shaft being shaped to define oil passageways permitting oil to flow past said crank, down inside said shaft, and radially out adjacent said resilient means and said load-sensitive means, to lubricate the same.

15. In a fishing reel, in combination, a bridge member; a stud rigidly mounted on said bridge member; an annular drive shaft rotatably mounted on said stud; an annular flange on the end of said shaft adjacent said bridge; a drive gear having a web portion overlying said flange; a lower annular friction washer between said web and said flange; an upper annular friction washer above said web; a thrust sleeve above said upper annular friction washer; manual adjustment means on said shaft for forcing said thrust sleeve toward said friction washers; resilient means below said thrust sleeve and carrying the thrust for rendering the gripping action of said friction discs gradual; load-sensitive means depending on the presence of lubricant for operation, below said thrust sleeve and subject to the thrust thereof, for reducing the effective friction cumulatively as rotation continues; a crank fixed on said shaft above said adjustment means; a fastening nut clamping said crank in place; said fastening nut having an oil receiving opening therein, said stud and shaft being shaped to define oil passageways permitting oil to flow past said crank, down inside said shaft, and radially out adjacent said resilient means and said load sensitive means, to lubricate the same.

16. In a fishing reel, in combination, a bridge member; a stud rigidly mounted on said bridge member; an annular drive shaft rotatably mounted on said stud; an annular flange on the end of said shaft adjacent said bridge; a drive gear having a web portion overlying said flange; a lower friction washer between said web and said flange; an upper annular friction washer above said web; a thrust sleeve above said upper annular friction washer; manual adjustment means threaded on said shaft for forcing said thrust sleeve toward said friction washers; and resilient means below said thrust sleeve and carrying the thrust for rendering the gripping action of said friction discs gradual, said resilient means including a plurality of resilient members of different stiffness arranged to act successively as the sleeve is forced down.

17. In a fishing reel, in combination, a bridge member; a stud rigidly mounted on said bridge member; an annular drive shaft rotatably mounted on said stud; an annular flange on the end of said shaft adjacent said bridge; a drive gear having a web portion overlying said flange; a lower friction washer between said web and said flange; an upper annular friction washer above said web; a thrust sleeve above said upper annular friction washer; manual adjustment means threaded on said shaft for forcing said thrust sleeve toward said friction washers; and resilient means below said thrust sleeve and carrying the thrust for rendering the gripping action of said friction discs gradual, said resilient means including three resilient members of different degrees of stiffness arranged to act successively as the sleeve is forced down.

18. In a fishing reel, in combnation, a bridge member; a stud rigidly mounted on said bridge member; an annular drive shaft rotatably mounted on said stud; an annular flange on the end of said shaft adjacent said bridge; a drive gear having a web portion overlying said flange; a lower friction washer between said web and said flange; an upper annular friction washer above said web; a thrust sleeve above said upper annular friction washer; manual adjustment means threaded on said shaft for forcing said thrust sleeve toward said friction washers; and resilient means below said thrust sleeve and carrying the thrust for rendering the gripping action of said friction discs gradual, said resilient means including a large conical washer, and a smaller flat washer concentric therewith and transmitting sleeve thrust thereto.

19. In a fishing reel, in combination, a bridge member; a stud rigidly mounted on said bridge member; an annular drive shaft rotatably mounted on said stud; an annular flange on the end of said shaft adjacent said bridge; a drive gear having a web portion overlying said flange; a lower friction washer between said web and said flange; an upper annular friction washer above said web; a thrust sleeve above said upper annular friction washer; manual adjustment means threaded on said shaft for forcing said thrust sleeve toward said friction washers; and resilient means below said thrust sleeve and carrying the thrust for rendering the gripping action of said friction discs gradual, said resilient means including a large conical washer, and a smaller conical washer overlying and reinforcing the inner portion of the large washer.

20. In a fishing reel, in combination: a crank; a spool; a frame supporting said crank and spool; a transmission including friction drive means connecting said crank and spool; manual loading means for imposing a load on said friction drive means; and resilient means forming part of said manual loading means and conveying the load to said friction drive means; said resilient means including a plurality of resilient members of different stiffness arranged in series, whereby said resilient members act successively as the load is increased.

JOHN V. SCHAFER.